United States Patent [19]

Koch

[11] Patent Number: 5,415,618
[45] Date of Patent: May 16, 1995

[54] METHOD FOR CONTROLLING THE OPERATING PARAMETERS OF AN INCUBATOR

[75] Inventor: Jochim Koch, Hollenbek, Germany

[73] Assignee: Drägerwerk Aktiengesellschaft, Lübeck, Germany

[21] Appl. No.: 580,549

[22] Filed: Sep. 11, 1990

[30] Foreign Application Priority Data

Sep. 12, 1989 [DE] Germany .................. 39 30 363.2

[51] Int. Cl.$^6$ ............................................. A61G 11/00
[52] U.S. Cl. .................................................... 600/22
[58] Field of Search .................................. 600/21–22; 128/736

[56] References Cited

U.S. PATENT DOCUMENTS 4,034,740   7/1977   Atherton et al. .................... 600/22

FOREIGN PATENT DOCUMENTS 3616359   11/1986   Germany .
2045978   11/1980   United Kingdom ............... 600/22

OTHER PUBLICATIONS

AGA Thermovision System 680 Pub. 556119, Oct. 1973.
Szeles et al, Biothermography in the 8–14 Micron Spectral Region, May 1969.
AGA Publication 556/048, Oct. 1973.
AGA Publication 556.005 Oct. 1973.
AGA—"Proven in the Worlds Great Hospitals" Oct. 1973.

Primary Examiner—Lee S. Cohen
Assistant Examiner—John P. Lacyk
Attorney, Agent, or Firm—Walter Ottesen

[57] ABSTRACT

The invention is directed to a method for controlling the operating parameters of an incubator influencing the thermal metabolism of an infant placed in the incubator. The method provides that the control takes place based on the complete defined thermal metabolism of the infant. For this purpose, at least two of four temperature sensors are present for different temperature zones referred to the body of the patient, namely, a sensor for the measurement of the temperature of the main organs, for the measurement of the skin temperature, for the measurement of the temperature of the periphery of the body and for the measurement of the ambient temperature. The output values of the sensors are supplied to a data processing unit which contains a first multi-dimensional table. This table includes table elements comprising condition desired values determined from experience. From the first table and after inputting of selected variables referred to the infant, a matrix is determined for the infant special condition desired values for the different temperature zones and from a comparison to a second multi-dimensional table, the infant is defined in its thermal condition in data called up from a decision matrix. The second multi-dimensional table contains the tolerances for the description of the different temperature conditions (for example, too cold, normal, too warm and the like).

9 Claims, 1 Drawing Sheet

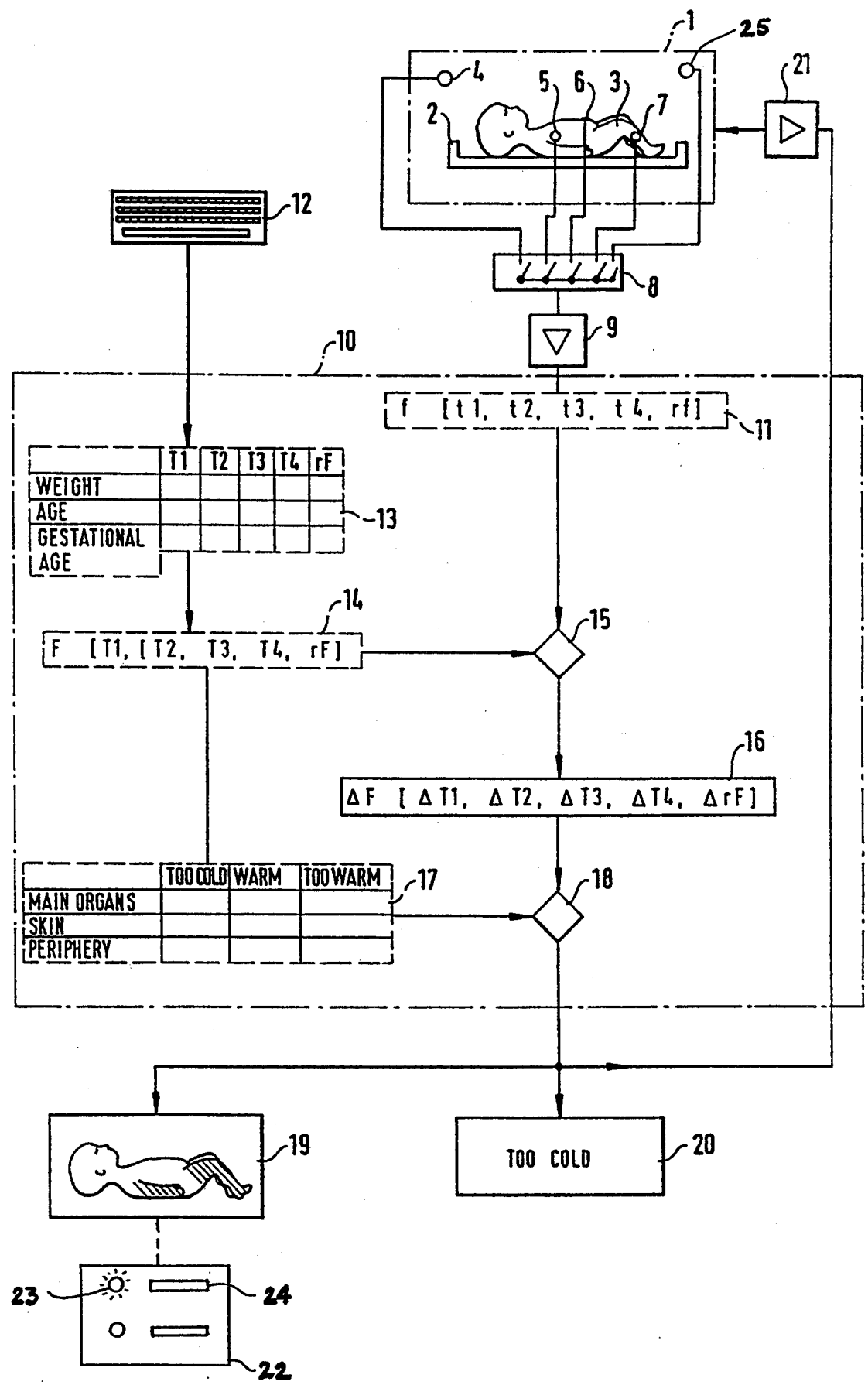

METHOD FOR CONTROLLING THE OPERATING PARAMETERS OF AN INCUBATOR

FIELD OF THE INVENTION

The invention relates to a method for controlling the operating parameters of an incubator determining the thermal metabolism of a premature or newborn infant placed in the incubator. Sensors are provided which are connected to the body and to the ambient atmosphere for determining the condition actual values. The output values of the sensors are supplied to a data processing unit which processes these values to produce actuating variables for influencing the operating parameters.

BACKGROUND OF THE INVENTION

Establishing and maintaining a defined thermal metabolism is of great significance with infants and has substantially determined the development of incubators, heated beds and radiation heaters.

Generally, a rectal or localized skin temperature known in advance is not adequate for defining the thermal condition and for metering the applied thermal energy. These measured values are not sufficiently definitive with respect to the overall thermal metabolism of the infant and it is therefore an object of the invention to provide a method which provides an overall view of the thermal balance of the infant and of its condition (hypothermia, neutral behavior, fever, shock, etc.). It is another object of the invention to provide this overall view with the least possible ancillary means.

Published German patent application DE-OS 36 16 359 discloses an incubator having radiant heaters. A sensor device for the more important parameters such as air temperature, air humidity, skin temperature, pulse frequency and the like are also disclosed. An alarm device is provided to directly indicate any deviation from the permissible range of the parameters. However, such a monitoring method does not provide adequate knowledge of the temperature zones determining the thermal metabolism and the control of the operating parameters is therefore essentially determined by arbitrarily selected desired values.

SUMMARY OF THE INVENTION

The invention is based on the premise that the operating parameters of an incubator can be specifically determined based on a precisely defined thermal condition of the premature or newborn infant. According to a feature of the invention, two to four temperature sensors are provided for different temperature zones of the body, namely, for the measurement of the following temperatures: main organs, skin, body periphery and the ambient. The output values are supplied to a data processing unit which includes a first multi-dimensional table, a first dimension of the table is determined from the sensors used and another dimension of the table is determined by the selected variables based on the infant. The table elements comprise condition desired values determined from experience. A matrix having condition desired values especially for prematures or newborns is determined and these desired values include: main organ temperature, skin temperature, periphery temperature and the like. The second multi-dimensional table contains the tolerances for the description of various temperature conditions such as too cold, normal, too warm and the like. From a comparison with this second multi-dimensional table in combination with the condition actual values, the premature or newborn is defined in its thermal condition (for example, main organs in normal condition, skin too cold, periphery too cold, etc.) in data which can be called up from a decision matrix.

Such a method defines the thermal condition of a newborn precisely and the actual condition and possible further developments with changes of the operating parameters can be determined or predicted from the relationship of the temperature values in the individual temperature zones referred to the body.

With the direct temperature measurement, a simple temperature zone model can be obtained in that four temperature parameters are measured (temperature of the main organs, skin temperature, peripheral temperature and ambient temperature in the incubator). From these temperatures, the condition of the main organs, the skin surface, the periphery and the relationship to the ambient can be displayed in a simple manner.

The individual thermal conditions can be defined by the relationship between the individual temperature values. Accordingly, the following terms (a) to (e) can mean the following: (a) intense hypothermia: main organ temperature and peripheral temperature below 36.5° C.; (b) slight hypothermia: main organ temperature approximately 37° C. and peripheral temperature below 36.5° C.; (c) normal region: main organ temperature and peripheral temperature approximately 37° C.; (d) slight fever: main organ temperature and peripheral temperature above 37° C.; and, (e) shock: main organ temperature approximately 35° C., skin temperature below 35° C.

A further improvement of the method can be obtained in that the output value of a humidity sensor from the ambient atmosphere is processed in addition to the output values of the temperature sensors. The humidity level influences significantly the heat-conductive capacity of the ambient air and the heat exchange between body and ambient atmosphere.

According to another embodiment of the invention, the visual illustration on an output display is made visible (so-called thermal monitoring) with the output display showing the defined heat condition in the form of a simulated infant body. The magnitude of the deviation between the condition actual value and the condition desired value is emphasized by means of an optically distinguishing recognition raster. The visual illustration can preferably be multi-colored and, in this way, the individual temperature zones referred to the body and their changes can be illustrated in an especially striking manner.

An advantageous embodiment can further provide that the actuating variables of the incubator can be changed via a control command in such a manner that the condition actual values approximate the condition desired values.

If, for example, the following temperatures result from the logic inquiry: main organ temperature 36.5° C., peripheral temperature 36.5° C., skin temperature 36.5° C., ambient temperature in the incubator 36.5° C., then it can be concluded that the infant has slight hypothermia and that the ambient temperature is too low in order to adequately warm up the infant.

The thermal condition is made visible on the display by colored differentiation of the body temperature zones and a recommendation can be outputted on the display that a higher temperature adjustment of the incubator should be selected. The desired value can be automatically set higher for the temperature of the incubator heating device by the control command and in this way, a control of the heating to a higher temperature results so that the heating is controlled to the higher temperature value.

Expressive colors are used for the individual temperature zones in a multi-colored illustration; for example, blue for colder and red for warmer zones at different levels.

It is further advantageous to generate fictitious condition actual values as output values by an arbitrary fictitious change of the operating parameters and that these output values, after input of the selected variables referred to the infant, are compared to the condition desired values resulting therefrom whereby exercise or test runs for the adjustment of the operating parameters can be carried out or can be optimized in their effect on the condition actual values. In this way, exercises can, for example, be conducted as to what effects different commands in the form of trends or thermal conditions of the infant produce. By means of an inquiry and the output of expert knowledge, a recommendation can be obtained as to, for example, how the heating device must be adjusted in order to bring the infant to the desired thermal condition.

It can also be advantageous to determine boundary values for the deviation of the condition actual values from the condition desired values and to call up characteristic fields when these limit values are exceeded which initiate a warning signal, for example, optical and/or acoustic signals.

An advantageous further embodiment provides that the time change of the deviation between the inputted condition actual value and the determined condition desired values are stored in a prognosis field which can be called up from the data processing unit.

Finally, it can be advantageous to fix boundary values in the prognosis field for the time changes of the deviation of the condition actual values from the condition desired values and to call up characteristic fields when these boundary values are exceeded which trigger prognosis displays, if required, directly and in clear language.

The features of the invention provide a method by means of which the thermal condition of a premature or newborn infant can be defined without difficulty so that directed actuating orders to change the operating parameters can be issued with respect to the desired thermal condition.

BRIEF DESCRIPTION OF THE DRAWING

The invention will now be described with reference to the drawing which shows a schematic incorporating a flowchart.

DESCRIPTION OF THE PREFERRED EMBODIMENTS OF THE INVENTION

The drawing shows an incubator 1 wherein an infant 3 is disposed lying on a bed 2. Sensors are provided for illustrating the temperature zones referred to the body. Sensor 4 is provided to detect the ambient temperature t1, a sensor 5 for the temperature t2 of the main organs, a sensor 6 for the skin temperature t3 and a sensor 7 for the peripheral temperature t4. In addition, a humidity sensor 25 can be provided for determining the relative humidity rf.

The output values of the sensors are collected at a measuring position change-over switch 8 and are individually supplied to a data processing unit 10 via a measuring amplifier 9. The data processing unit 10 includes a first matrix 11 having the measurement values of this infant.

An input unit 12 is provided for inputting data specific to the infant. With this input unit, the special selected variables (for example, age, weight and weeks of pregnancy) can be inputted to the data processing unit 10. The data processing unit 10 contains a first multi-dimensional table 13 in which condition desired values determined from experience are stored. These condition desired values are, for example, weight, age, gestational age, ambient temperature t1, temperature t2 of the main organs, skin temperature t3, peripheral temperature t4 and relative humidity rF. From this first multi-dimensional table, experience values known to medicine are transmitted to a second matrix 14 for outputting the condition desired values F (T1, T2, T3, T4, rF) of the special infant. A comparison unit 15 compares the condition actual values to the desired values in a unit 16 which determines the differences ΔF between the condition actual values which are present and the condition desired values.

The tolerances of the condition desired values are stored in a second multi-dimensional table 17 and these tolerances are compared by a further comparison unit 18 to the actual deviations present. If the deviations are exceeded, then additional characteristic fields can be called up which are not shown in the drawing and which, for example, trigger a warning indication in the form of an acoustic signal.

The temperature zones referred to the body are supplied in color to a display 19 in the form of a simplified diagram of the body. An additional trend indicating unit 20 provides indications as to possible condition changes.

The trend indicating unit 20 can contain both a warning indicator and a prognosis indicator. The display "too cold" in the trend indicating unit is a warning for attending personnel. On the other hand, both indicators can be coupled to the display 19 as shown. In this way, the graphical indicator of the display 19 is supplemented by a warning and prognosis indicator 22 on which a warning lamp 23 illuminates and a preprogrammed prognosis text 24 appears next to the corresponding lamp.

The method of the invention includes the steps of: applying the outputs of at least two of the temperature sensors (4, 5, 7) to a data processing unit 10 for processing the outputs to actuating variables for influencing the operating parameters; computing a first value matrix 11 by evaluating the outputs of at least two of the temperature sensors; the data processing unit including: a first multi-dimensional table 13 having one dimension determined by said at least two sensors; another dimension determined by selected variables referred to the infant; and, table elements including condition desired values determined from experience; determining a second value matrix 14 from the first multi-dimensional table 13 after inputting the selected variables, the matrix 14 having condition desired values for the various temperature zones for the infant; determining a difference value matrix 16 by comparing the first value matrix 11 with the second value matrix 14; and, making a comparison between the difference value matrix 16 and a second multi-dimensioned table 17 containing the tolerances for the description of the different temperature conditions (such as too cold, normal, too warm) in combination with the condition actual values to define the infant in its thermal condition (main organs in normal condition, skin too cold, periphery too cold, etc.) in data which can be called up from a decision matrix.

The condition actual values on the infant can be changed in a desired manner by feeding back the measured values to the command variable (control loop) of a control arrangement 21 for the heating device of the incubator.

The measuring sensors used can be configured according to different known measuring principles, for example, for direct temperature measurement or as thermographic cameras (infrared measurement).

It is further advantageous to generate fictitious condition actual values as output values by an arbitrary fictitious change of the operating parameters and that these output values, after input of the selected variables referred to the infant, are compared to the condition desired values resulting therefrom whereby exercise or test runs for the adjustment of the operating parameters can be carried out or can be optimized in their effect on the condition actual values. In this way, exercises can, for example, be conducted as to what effects different commands in the form of trends or thermal conditions of the infant produce. By means of an inquiry and the output of expert knowledge, a recommendation can be obtained as to, for example, how the heating device must be adjusted in order to bring the infant to the desired thermal condition.

More specifically and according to another embodiment of the invention, the method includes the further steps of: generating fictive condition actual values as output values by means of a fictive change of operating parameters; applying the infant-related selected variables to said data processing unit to obtain condition desired values; comparing said output values to said condition desired values; and, carrying out exercise and test runs for adjusting the operating parameters and optimizing said exercise and test runs with respect to the effect thereof on the condition actual values.

It is understood that the foregoing description is that of the preferred embodiments of the invention and that various changes and modifications may be made thereto without departing from the spirit and scope of the invention as defined in the appended claims.

What is claimed is:

1. A method for determining the operating parameters of an incubator influencing the thermal metabolism of an infant placed in the incubator, the infant having temperature zones on the body at which temperature can be sensed with the aid of respective sensors including: a first temperature sensor for measuring the temperature of the main organs, a second temperature sensor for measuring the skin temperature, a third temperature sensor for measuring the peripheral temperature; and, a fourth temperature sensor being provided for measuring the ambient temperature, the incubator having a control unit for adjusting said operating parameters, the method comprising the steps of:

applying the outputs of at least two of said temperature sensors to a data processing unit for processing the outputs to actuating variables for influencing said operating parameters;

computing a first value matrix by evaluating the outputs of at least two of said temperature sensors;

the data processing unit including: a first multi-dimensional table; a dimension determined by selected variables referred to the infant; and, table elements including condition desired values determined from experience;

determining a second value matrix from said first multi-dimensional table after inputting said selected variables, the matrix having condition desired values for the various temperature zones for said infant;

determining a difference value matrix by comparing said first value matrix with said second value matrix in a first comparing unit; and, making a comparison in a second comparing unit between said difference value matrix and a second multi-dimensional table containing the tolerances for the description of the different temperature conditions (such as too cold, normal, too warm) in combination with the condition actual values to define the infant in its thermal condition (main organs in normal condition, skin too cold, periphery too cold, etc.) and the difference between said deviation matrix and said second multi-dimensional table, resulting from said comparison, setting said operating parameters anew via said control unit.

2. The method of claim 1, wherein the output value of a humidity sensor of the ambient atmosphere is processed in addition to the output values of the temperature sensors.

3. The method of claim 2, wherein the defined thermal condition is made visible on an output display unit as a display in the form of a simulated infant body with the magnitude of the deviation of the condition actual value and the condition desired value is made visible by an optically distinguishable recognition raster.

4. The method of claim 3, wherein said display is in color.

5. The method of claim 3, wherein the actuating variables of the incubator are changed in such a manner that the condition actual values approximate the condition desired values.

6. The method of claim 1, wherein the method comprises the further steps of:

generating fictive condition actual values as output values by means of a fictive change of operating parameters;

applying the infant-related selected variables to said data processing unit to obtain condition desired values;

comparing said output values to said condition desired values; and, carrying out exercise and test runs for adjusting the operating parameters and optimizing said exercise and test runs with respect to the effect thereof on the condition actual values.

7. The method of claim 1, comprising the further steps of: determining limit values in said decision matrix for the deviation between condition actual values and condition desired values; and, calling up characteristic fields, which trigger warning indications, when said limit values are exceeded.

8. The method of claim 1, wherein the time change of the deviation between inputted condition actual values and the determined condition desired values are stored in a prognosis field, which can be called up, of said data processing unit.

9. The method of claim 8, wherein limit values are fixed in said prognosis field for the time change of the deviation of the condition actual values from the desired values; and, characteristic fields are called up when the limit values are exceeded for triggering prognosis indications.

* * * * *